United States Patent [19]

Farah

[11] 3,711,571
[45] Jan. 16, 1973

[54] CURABLE BLEND OF BLOCKED AND UNBLOCKED POLYURETHANES

[75] Inventor: Basil S. Farah, Elma, N.Y.

[73] Assignee: Textron Inc., Providence, R.I.

[22] Filed: July 9, 1970

[21] Appl. No.: 53,678

[52] U.S. Cl........260/858, 117/161 KP, 260/77.5 TB
[51] Int. Cl..........................C08g 41/04, C08g 22/32
[58] Field of Search..........................260/858, 75 NH, 77.5 AM, 77.5 TB

[56] References Cited

UNITED STATES PATENTS

| | | | |
|---|---|---|---|
| 3,385,829 | 4/1968 | Heydkamp et al. | 260/75 |
| 2,929,800 | 3/1960 | Hill | 260/77.5 |
| 3,248,373 | 4/1966 | Baninger | 260/77.5 |
| 3,384,506 | 5/1968 | Elkin | 117/62 |
| 3,361,844 | 1/1968 | Hoeschele | 260/858 |
| 3,252,848 | 5/1966 | Borsellino | 156/307 |
| 3,036,996 | 5/1962 | Kogon | 260/77.5 |
| 3,481,905 | 12/1969 | Wilden | 260/75 |
| 3,188,302 | 6/1965 | Lorenz | 260/77.5 |
| 3,194,793 | 7/1965 | Kogon | 260/77.5 |
| 3,284,539 | 11/1966 | McElroy | 260/858 |
| 3,297,758 | 1/1967 | Hoeschele | 260/570 |
| 3,438,922 | 4/1969 | Ueno et al. | 260/29.3 |
| 3,471,445 | 10/1969 | Carr | 260/75 |
| 3,494,894 | 2/1970 | Urgesi | 260/75 |

OTHER PUBLICATIONS

Saunders et al. – Polyurethanes, Part II, Interscience New York (1964) pages 299–305.

*Primary Examiner*—Donald E. Czaja
*Assistant Examiner*—H. S. Cockeram
Attorney—John W. Behringer, Eugene L. Bernard, Martin J. Brown, James N. Dresser, W. Brown Morton Jr., John I. Roberts and Malcolm L. Sutherland

[57] ABSTRACT

There are disclosed curable polyurethane compositions comprising:

I. A normally-liquid, free isocyanate-blocked urethane prepolymer composition comprising the reaction product of (A) a diisocyanate-polyol urethane prepolymer containing free isocyanate groups, and (B) an isocyanate-reactive oxime, said reaction product being made by reaction of an essentially stoichiometric equivalent of (B) per equivalent of free isocyanate in (A); and II. an elastomeric, polyamine-extended polyurethane comprising the reaction product of (A) a diisocyanate-polyol urethane prepolymer containing free isocyanate groups, and (B) an isocyanate-reactive polyamine, said reaction product being made by the reaction of an essentially stoichiometric equivalent of (B) per equivalent of free isocyanate in (A). The compositions are normally cured at temperatures above room temperature, especially above about 70° C. and advantageously above about 130° or even above about 145° C. Additionally, the cured compositions are useful as coatings for both flexible and rigid articles such as textiles, leather, vinyl and rubber materials, metal, wood are rigid plastic materials. In a preferred embodiment, the oxime in (I) is methyl ethyl ketoxime and the polyamine in (II) is 1-amino-3-aminomethyl-3,5,5-trimethyl cyclohexane, while the urethane prepolymer in both (I) and (II) is prepared from toluene diisocyanate or 1-isocyanato-3-isocyanato methyl-3,5,5-trimethyl cyclohexane with trimethyol propane as the polyol in (I) and a polyester of a glycol and adipic acid as the polyol in (II). The coatings prepared from the compositions of this invention are normally highly resistant to abrasion and chemical attack.

32 Claims, No Drawings

CURABLE BLEND OF BLOCKED AND UNBLOCKED POLYURETHANES

This invention relates to curable polyurethane coating composition mixtures of a polyamine-extended, elastomeric polyurethane and an oxime-blocked polyurethane prepolymer. The coating materials of this invention are normally formed by admixing the polyamine-extended polyurethane with the blocked polyurethane prepolymer and heating the admixture until a reaction product exhibiting considerably improved physical properties as well as increased chemical resistance, when compared to materials derived only from the polyamine-extended polyurethane, is prepared. Coatings useful on both flexible and rigid substrates may be formed.

The polyamine-extended polyurethane and oxime-blocked polyurethane prepolymers used to form the compositions of this invention is each generally known. However, in the present invention the unblocked free isocyanate groups of a polyurethane prepolymer are apparently reacted with what is normally considered to be a more or less completely reacted polyamine-extended polyurethane containing essentially no hydroxyl groups and little, if any, free amino ($-NH_2$) groups. It is difficult to advance a principle which explains the extensive reaction of the present invention in view of the essential absence of hydroxyl groups and the lack of any substantial amino group content in the polyamine-extended polyurethane. Even if such groups are present, they can only be in very small amounts which do not account for the relatively large amounts of isocyanate-blocked urethane prepolymer which can be reacted with polyamine-extended polyurethane. For example, an amount of blocked prepolymer corresponding to an available NCO content of several hundred times that needed to react with any residual amino or hydroxyl groups in the previously reacted polyamine-extended polyurethane can be essentially completely reacted according to this invention. That an extensive chemical reaction between the isocyanate groups generated in situ and the polyamine-extended polyurethane does occur, and that the final product is not a mere physical mixture of the polyamine-extended polyurethane and the isocyanate prepolymer generated in situ or of the extended polyurethane and the moisture-cured derivative of this prepolymer, are illustrated by the fact that the prepolymer, prior to blocking with oxime, normally forms a tacky and essentially non-utilizable film on admixing with the polyamine-extended polyurethane even after heating at temperatures at or even above those required for the formation of the excellent films derived from the products of this invention. Such action indicates that a chemical conversion is undergone by the blocked prepolymer and extended polyurethane of this invention during heating which cannot be explained purely on the basis of cross-linking of the polyamine-extended polyurethane by the in situ produced, unblocked prepolymer isocyanate groups since such cross-linking would be expected to take place, but apparently does not, when the polyamine-extended polyurethane is heated with the prepolymer without blocking of the latter with oxime.

The coating compositions of this invention are curable polyurethane materials. Upon curing, the coatings obtained exhibit advantageous physical properties such as improved abrasion resistance, impact strength and hardness as well as improved chemical resistance compared to polyurethane materials prepared from the polyamine-extended polyurethanes themselves upon curing. The compositions of the polyamine-extended polyurethanes themselves may be such that they produce self-supporting films of substantial physical strength and chemical resistance without interaction with oxime-blocked prepolymer. In such a case, the physical and physiochemical properties of the polyamine-extended polyurethane are nonetheless improved substantially by interaction with the blocked prepolymer according to the present invention. Alternately, the composition of the polyamine-extended polyurethanes may be such that the products derived therefrom have slight or even no physical strength whatever. In such a case, these polyurethanes are converted to useful products of excellent physical properties by the process of the present invention.

In addition, the physical properties and the degree of chemical resistance of the products of the present invention can be altered by varying the ratio of the polyamine-extended polyurethane to the blocked prepolymer reacted. Thus either rigid materials, for example free films of Shore D60 hardness or higher, may be prepared if desired. Alternately, pliable films with a Shore A60 hardness or less may also be prepared in which case the films retain their flexibility at low temperatures. Normally, the products having high portions of polyamine-extended polyurethanes are more elastomeric.

Also, variation in the properties of the cured products of the present invention can also be accomplished by changes in the chemical structure of the polyamine-extended polyurethane and/or that of the blocked prepolymer. Films derived by the process of the present invention may thus be used to coat flexible substrates such as textiles, leather, vinyl and rubber materials, or they may be employed to coat hard surfaces such as metal, wood and rigid plastic materials. The products of the present invention may also be solvent cast to produce self-supporting thin films for use as packaging material, or they may be cast into thicker sheets or slabs which may be converted into granules for injection molding, extrusion and like operations.

The polyurethane prepolymers useful in making the blocked prepolymer and amine-extended polyurethane employed in this invention are reaction products of an essentially hydrocarbon diisocyanate with urethane-forming polyol. Since the prepolymers are prepared using an excess of the diisocyanate reactant they can be characterized as being isocyanate-terminated. The prepolymers are in the essentially liquid state either as the polymer per se or dissolved in a solvent. The prepolymer is generally stable in the sense that it will not cure to an insoluble solid unless further contacted with water, polyol or other active-hydrogen containing material. These prepolymers can often have a free isocyanate group content of about 1 to 30, frequently at least about 2 and preferably about 10 to 20, weight percent based on the total prepolymer solids present.

The prepolymer is formed from a stoichiometric excess of isocyanate, and the prepolymer generally is made from reactants in amounts giving a ratio of total isocyanate groups to total hydroxyl radicals of at least 1.2:1, often up to about 3:1 or more. The ratio of isocyanate groups to hydroxyl groups can affect the properties of the compositions, but undesirable results can be offset by using, when making the prepolymer, a polyol of appropriate molecular weight. For example, with a given prepolymer, increases in the ratio of NCO to OH generally provide final coatings of greater film hardness with concomitant reduced flexibility and impact resistance; however, these effects can be modified by using a longer chain polyol.

An essential component used in making the prepolymer compositions employed in the present invention is, as noted, one or more polyols. The polyol component of a given prepolymer is composed to a major molar extent of aliphatic polyol, that is, polyol in which there are at least two hydroxyl groups attached to acyclic or cyclic aliphatic carbon atoms. The polyol component may be composed to a minor molar extent of polyol having the hydroxyl groups attached to aromatic carbon atoms. The polyol can be composed, especially in making the prepolymer which is amine-extended, to a major molar extent of diol, including the ether and polyester diols, although triols or other polyols having greater than three hydroxyl groups as well as their mixtures with diols can be employed to make either prepolymer. The polyols, may be selected from a wide variety of polyhydroxyl materials which may be aliphatic, including cycloaliphatic, structures which may have aromatic portions. The polyol may have a molecular weight of up to about 5,000 or more, but preferably its major weight amount in the prepolymer which is amine-extended has a molecular weight of at least about 400, say about 750 to 4,000. A low molecular weight polyol, e.g., having molecular weights of less than about 200 or 300 is advantageous in the blocked prepolymers and further the major molar amount of such polyol may have three or more hydroxyl groups.

Among the wide variety of polyols which can be used in making the prepolymers employed in this invention are those represented by the formula:

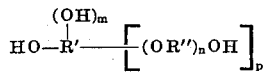

in which R' is an aliphatic hydrocarbon radical, preferably saturated, and R'' is an alkylene radical of two to four, preferably two to three, carbon atoms; R' preferably has two to 12, advantageously two to six, carbon atoms. The letter $n$ may represent a number from 0 to about 50, depending on the molecular weight desired, while the letter $p$ is 0 to about 4 and the letter $m$ is 0 to 3 or more. When $n$ is other than 0, R' may often be the same as R''. When $n$ is 2 or more polyethers are provided. Suitable polyethers may also include those made from an alkylene oxide and an alcohol having more than two hydroxyl groups in which case R' and R'' may well be different, m will be zero and there will be two or more (—OR'')$_n$ OH groups attached to R', i.e., $p$ is greater than 1.

Suitable aliphatic polyols used in making the prepolymers include the polyether glycols of up to about 5,000 or more molecular weight, such as the polyethylene glycols, polypropylene glycols, and polybutylene glycols. The latter materials include the straight chain polybutylene glycols often referred to as polytetramethylene ether glycols, as well as the branched chain polybutylene glycols, for instance, made from 1, 2- and 2,3-butylene oxides and designated broadly as polybutylene glycols. Among the relatively low molecular weight or simple polyols which can be used are trimethylol propane, butane diols, trimethylol ethane, 1,6-hexamethylene glycol, 1,2,6-hexanetriol, glycerol, etc.

Others among the polyols useful for preparing the polyurethane prepolymers used in the invention include the hydroxy esters such as castor oil, polyol-modified fatty oils and hydroxy-terminated polyesters. The hydroxy-terminated polyester materials are generally made by reaction of one or more polyhydroxy materials, such as the aliphatic polyols mentioned above, with one or more aliphatic, including cycloaliphatic, or aromatic, polycarboxylic acids or esters, and such polyesters can often have hydroxyl values in the range of about 25 to 150. Frequently in these polyesters, the polyhydroxy alcohols are predominantly diols and the acids are dicarboxylic acids, including their anhydrides, and preferably contain from four to 50 carbon atoms, e.g., phthalic acid, adipic acid, sebacic acid, dimers of olefinically-unsaturated monocarboxylic acids, such as linoleic acid dimer, etc. Modified castor oil partial esters can be made by ester interchange of the oil with polyols such as low molecular weight polyols, including glycols, glycerine, pentaerythritol, etc. These polyesters often have molecular weights in the range of about 500 to 2,000 or 3,000.

Although diisocyanate is an essential reactant in preparing the prepolymers employed in the present invention, minor molar amounts of other polyisocyanates may be reacted providing the compositions are not unduly deleteriously affected. In making the urethane prepolymers one or more of a variety of essentially hydrocarbon diisocyanates can be employed. Thus, the diisocyanates and any other polyisocyanate may be aliphatic, including cyclo-aliphatic, aromatic or mixed aliphatic-aromatic structures. Aromatic diisocyanates having the isocyanate groups attached to one or two aromatic rings are often used and are readily available. The isocyanates may be substituted with non-interfering groups. The hydrocarbon portion of the diisocyanate often has at least about four carbon atoms and usually does not have more than about 24 carbon atoms. Diisocyanates of about six to 20 carbon atoms in the hydrocarbon portion are preferred. Suitable diisocyanates include the completely hydrogenated form of di-(isocyanato phenyl) methane, 1-isocyanato-3-isocyanatomethyl-3,5,5-trimethyl cyclohexane, hexamethylene diisocyanate, completely hydrogenated tolylene diisocyanate, 2,4,4-trimethyl hexamethylene diisocyanate, 2,6-tolylene diisocyanate, 2,4-tolylene diisocyanate, p-phenylene diisocyanate, p,p'-diphenylmethane diisocyanate, 1,5-naphthalene diisocyanate, etc. The use of aromatic diisocyanates generally lowers the resistance of the final products to the discoloring effects of ultraviolet light, and the presence of diisocyanato dicyclohexyl methane may make the prepolymers more susceptible to gellation.

The polyurethane-type prepolymer reaction products useful in the present invention can be made by mixing excess diisocyanate with polyol. The diisocyanate can be reacted with part or all of one or more of the polyols prior to the reaction with the remaining portion of these materials. Stepwise mixing of the diisocyanate with the polyol may be used to enhance temperature control. The reaction temperatures for making the various urethane prepolymers used in the present invention are often in the range of about 40° to 150° C., with about 50° to 130° C. being preferred; and the reaction is preferably continued until there is essentially little, if any, unreacted hydroxyl functionality remaining. As noted above, wide variations in the nature and amounts of the polyol or polyol mixtures used in the preparation of the compositions of this invention can be made.

Catalysts can be used in forming the prepolymers to accelerate the rate of reaction. Typically the catalysts can be organotin compounds, for example, dibutyl tin dilaurate and stannous octoate. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed.

The prepolymers used in the present invention may be prepared in the presence of solvent which is essentially inert in the system, e.g. those mentioned hereinafter for use in amine-extending the prepolymer. The solvent serves to insure that the reactants are in the liquid state and permits better temperature control during the reaction by serving as a heat sink and, if desired, as a refluxing medium.

Blocking of the free-isocyanate containing prepolymer to make one of the reactants essential to this invention, is effected by reaction of an essentially stoichiometric equivalent, including minor excesses, of an oxime, preferably a ketoxime but also including aldoximes, per equivalent of free isocyanate in the prepolymer. Suitable oximes include those represented by the formula:

wherein R is a hydrocarbyl group of up to about 20 carbon atoms or hydrogen. Preferably, however, at least one R group is hydrocarbyl. The oximes encompassed by the above formula exist in both the syn and anti forms. Even more preferably the R groups are both hydrocarbyl of up to about 10 carbon atoms such as alkyl, cycloalkyl, aryl, alkaryl and aralkyl groups, e.g., lower alkyl. The two R groups may be joined to form a ring with the carbon atom attached to the nitrogen atom shown in the above formula. Exemplary R groups are methyl, ethyl, isobutyl, octyl, cyclohexyl, benzyl and phenethyl. Particularly advantageous oximes are methyl ethyl ketoxime, dimethylketoxime, cyclohexanone oxime, benzaldoxime ethylhexyl ketoxime, methyl butyl ketoxime, benzophenone ketoxime, acetone oxime and the like.

The blocking of the urethane prepolymer can be effected by simply adding the above oxime blocking agent to the diisocyanate-aliphatic polyol prepolymer. Temperatures for the blocking reaction may be about 25° to 145° C., preferably about 45° to 130° C., and the reaction should proceed for a time sufficient to provide blocking of essentially all of the free isocyanate groups of the prepolymer. Generally unblocking occurs more easily if one or both of the diisocyanates is aromatic. The order of ease of unblocking based upon the character of the diisocyanates is generally 2 aromatic > one aromatic - one aliphatic > 2 aliphatic.

The blocked prepolymer-containing composition useful in the present invention is normally in an essentially liquid state for use in the reaction with the polyamine-extended polyurethane. The blocked prepolymer may itself be liquid or be those which can be present in the prepolymer reactant. Heating of the compositions to temperatures of the order used for curing the blocked prepolymer-polyamine extended polyurethane mixture causes the prepolymer to unblock and make the isocyanate groups available for reaction. Such heating can be effected, for example, by baking the mixture after it has been applied to a solid substrate as a coating. Over an extended period, however, some unblocking may occur even at room temperature.

In preparing the polyamine modified or extended urethanes useful in this invention, the above-described urethane prepolymers of diisocyanate and polyol, can be reacted with polyamines, preferably diamines, in the presence of a solvent for both the prepolymer and the resulting polyamine modified urethane, also known as urea-urethane, to obtain a solution of the polyamine-modified urethane (urea-urethane) in the solvent. According to this invention, compositions may be prepared wherein the blocked polyurethane prepolymer and the polyamine-modified or extended urethane may be prepared from the same or different urethane prepolymers.

The amounts of the urethane prepolymer and polyamine reacted and the reaction conditions are chosen so that essentially all of the isocyanate content of the prepolymer is reacted on a weight basis. Since an essentially stoichiometric amount of polyamine is used the free isocyanate content of the urea-urethane is less than about 1 weight percent, and often this free isocyanate content is less than about 0.1 percent. The essentially stoichiometric amounts of polyamine include slight excesses of amine, and in such case the urea-urethane may exhibit a definite, but low amine value. Such amine values can be decreased, if desired, as by further reaction with the prepolymer since the use of an excess of amine is not necessary in making the urea-urethane used in this invention. The urea-urethane-forming reaction can be conducted at ambient temperatures and generally the reaction temperature is in the range of about 10° to 120° C. or more, preferably about 50° to 100° C. The urea-urethane-forming reaction may, if desired, be catalyzed, for instance, by the use of catalysts similar to those mentioned above with respect to the urethane prepolymer-forming reaction. When the urea-urethane solution and blocked urethane prepolymer mixture is cured the evaporation of solvent can be facilitated due to the application of elevated temperatures. The cured polymer is normally non-cellular as distinguished from a foam.

Among the solvents which can be present during the urea-urethane-forming reaction are the various liquid organic solvents, often having up to about 10 carbon atoms, such as aromatic hydrocarbons; oxygen-containing hydrocarbons, including alcohols, esters, ethers, glycol ether esters, ketones and amides; ring nitrogen-containing organic materials including the pyrrolidones; as well as chlorinated hydrocarbons and the like; and mixtures thereof. Solvents in which the major component by weight is dimethyl formamide or N-methyl-2-pyrrolidone have been found to be especially suitable.

The solvent may be similar to those employed in the urethane prepolymer-forming reaction or different solvents may be used in each reaction, and the solvent is essentially inert in both systems. Solvents present during the urea-urethane-forming reaction are normally relatively volatile materials which will be removed from the final coatings during the curing operation. Although the amount of solvent employed during the urea-urethane-forming reaction is conveniently that which will give a product solution of useful viscosity for mixing with the blocked prepolymer component. Although lesser or greater amounts of solvent can be employed, about 1 to 10 weights of solvent per weight of the total prepolymer and polyamine are often used. The urea-urethane solution is generally of suitable viscosity when the solids comprise about 15 to 50 weight percent of the solution.

The polyamines which can be employed to make the modified urethane prepolymers (urea-urethanes) useful in this invention can be selected from a wide variety of suitable materials. Thus, the polyamine may be an aliphatic, including cycloaliphatic, aromatic or mixed aliphatic-aromatic structure and have at least two amino (—NH$_2$) groups per molecule. Often the polyamine has up to about 40 or more carbon atoms, preferably about six to 15 carbon atoms, and may contain other substituents which normally are non-reactive with isocyanate groups. The preferred polyamines are diamines, e.g., diprimary diamines, and further, the aliphatic, including cycloaliphatic, structures are especially advantageous, particularly to impart to the cured products improved resistance to the degradative and yellowing effects of ultraviolet light. Some urea-urethanes prepared from aromatic amines such as methylene dianiline, have exhibited relatively poor resistance against the deleterious effects of ultraviolet light. Among the useful polyamines are diamines such as ethylene diamine, propylene diamine, hexamethylene diamine, para-phenylene diamine, methylene dianiline, 1-amino-3-aminomethyl-3,5, 5-trimethyl cyclohexane, hexamethylene diamine, trimethylhexamethylenediamine, tolylenediamine, the completely hydrogenated form of di-(aminophenyl) methane, etc. Other types of polyamines which can be used in forming the products of the present invention include 4,4-methylene-bis(2-chloroaniline) and N,N'-disecondary-butylparaphenylene diamine.

The oxime-blocked urethane prepolymers and the solution of polyamine-modified or extended elastomeric polyurethane useful to form the curable polyurethane mixtures of this invention are combined either immediately before use or even at substantial periods of time before use. The mixtures are quire stable on storage at relatively low temperatures due to the fact that the oxime-blocked urethane prepolymers are normally stable even below about 65° C. for substantial periods of time. Normally, the mixture is heated to above about 100° C. or above about 130° C. to effect curing. The blocked prepolymer must be heated to a temperature sufficient to cause at least substantial, preferably essentially complete, unblocking of the available isocyanate groups for reaction with the polyamine-extended polyurethane. Advantageously, the mixture is heated to at least about 150° C. to effect curing. For example, heating to about 150° C. will normally effect a cure of the composition in a period of a few minutes while heating at about 350° C. or above effects the cure in a period of seconds or even less. Curing may be accomplished at temperatures as low as about 70° C. if heating is continued for several hours. Over extended periods partial curing might even occur at room temperature. Such a procedure is, however, not generally practical.

The amounts of blocked isocyanate prepolymer and polyamine-modified polyurethane useful in preparing the coating compositions of this invention may vary over a wide range, dependent primarily upon the desired properties for the final coating composition. Normally, however, from about 0.01 to 150 or more nitrogen atoms bearing at least one hydrogen is supplied by the urea-urethane per equivalent of unblocked or available isocyanate groups provided by the oxime-blocked polyurethane prepolymer; preferably this amount is about 0.1 to 50:1 or even about 0.1 to 10:1 for obtaining cured products of good impact strength, tensile strength, solvent resistance, toughness, and elongation. Exemplary of nitrogen atoms bearing at least one hydrogen atom in the urea-urethane are the nitrogen atoms of primary and secondary amino groups, amido groups, urethane

groups or ureido

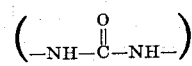

groups. Such amounts are frequently supplied by combining about 0.01 to 10 parts by weight (solids basis) of blocked prepolymer per part by weight (solids basis) of urea-urethane, more often about 0.05 to 5:1. Inert solvents useful in the preparation of the blocked prepolymer and the polyamine extended elastomeric prepolymer may be employed in the preparation of the final coating compositions; if present, the solvents are not included in a determination of the parts per weight of each component on a solid basis. Suitable solvents have been previously mentioned regarding the preparation of the urethane prepolymers and polyamine-extended solutions. Advantageously, the solvents should be easily volatilized at the curing temperatures used in the invention.

The coating composition of this invention can be employed in any way desired to take advantage of the characteristics of the products; for instance, the compositions may be used as coatings, adhesives, laminants or flocculants or formed into relatively thick sheets or other film-like materials. Due to the elastomeric properties of some of the products, they may be applied and employed in a manner to take advantage of such characteristics. The nonsupported film-type products generally have a thickness of up to about 100 mils or more often the coating compositions have a thickness of up to about 10 mils. The compositions can be formed into various materials or articles of greater cross-sectional dimensions, and the solutions can be employed in the various ways known in the art for utilization of these type of materials. The compositions can further contain additives to impart special properties such as plasticizers, pigments, fillers, etc., also the solid substrates bearing the coating, e.g., wood, cloth, etc., may be specially-treated materials, including flammable members impregnated with fire-resistant chemicals or coated with a sealant.

The following examples will serve to illustrate the present invention. In the usual technique the polyol component was initially azeotroped to remove water, and subsequently the urethane-prepolymer-forming reaction as well as that producing the urea-urethane, was conducted under an inert gas atmosphere in the usual manner. Blending of the prepolymer and the polyamine was at room temperature in each of the examples. The percent free NCO are reported on the basis of the total weight of the vehicle and the parts of materials employed are designated by weight unless indicated otherwise.

EXAMPLE I

A. Preparation of Prepolymer

A mixture of 1,000 parts diethylene glycol adipate polyester having a hydroxyl number of about 110 (Rucoflex Polyester 1011–112), 4,000 parts diethylene glycol adipate polyester having a hydroxyl number of about 41 (Rucoflex Polyester 1011–42) and 957 parts tolylene diisocyanate are heated at 90°–95° C. for about 5 hours under an inert atmosphere. Each of the polyesters had approximately two hydroxyl groups per average molecule. An isocyanate-terminated prepolymer is obtained having a viscosity of about 892 cps at 25° C. and a free NCO content of 5.25 percent by weight.

B. Preparation of Diamine Extended Polyurethane Solution

Five hundred parts of the prepolymer from Example IA is reacted with a solution of 59 parts of 1-amino-3-aminomethyl-3,5,5-trimethyl cyclohexane in 720 parts of methyl ethyl ketone. The polyurea-urethane solution obtained has a viscosity of about 2.0 cps at 25° C. and an amine value of about 8.1.

C. Preparation of Blocked Prepolymer

A mixture of 609 parts methyl ethyl ketoxime, 210 parts Cellosolve acetate, 210 parts xylene and 3,000 parts of an isocyanate-terminated prepolymer solution (60 percent non-volatile in a solvent comprising equal parts of Cellosolve acetate and xylene) of the reaction product of two equivalents of tolylene diisocyanate with one equivalent of trimethylol propane, is heated at a temperature of 70° C. until all of the isocyanate sites in the prepolymer had been reacted. The solution had a viscosity of 194 cps at 25° C. and 0 percent free NCO.

D. Preparation and Cure of the Heat Curable Composition

A mixture of 100 parts of the polyurea-urethane solution prepared as described in Example IB above and 5 parts of the blocked prepolymer solution prepared as described in Example IC above is stirred until completely homogeneous. Films of the solution are cast on two glass plates at a 3 mil wet thickness and air dried. One of the plates is then placed for 5 minutes in a forced draft oven maintained at 150° C. The properties of the heat cured and the air-dried films are shown in Table I.

EXAMPLE II

A. Preparation of the Heat Curable Polyurethane

One thousand five hundred twenty parts of the polyurea-urethane solution, prepared in Example IB, in 448 parts methyl ethyl ketone, is mixed with rapid agitation with a solution of 90 parts of the prepolymer prepared in Example IA in 90 parts methyl ethyl ketone. The viscous polyurethane solution obtained had a viscosity of 143 cps and an amine value of 0.9.

B. Preparation and Cure of a Heat Curable Composition

A mixture of 100 parts of a polyurethane solution prepared as in Example IIA and 100 parts of a blocked prepolymer solution prepared as in Example IC are stirred rapidly until completely homogeneous. Films of the solution are cast on two glass plates at a 3 mil wet film thickness and air-dried. One of the glass plates is placed for 5 minutes in a forced-air oven maintained at a temperature of 150° C. The properties of the heat cured and the air-dried films are described in Table I below.

TABLE I

| | Example ID | | Example IIB | |
|---|---|---|---|---|
| | Air-dried | Heat-cured | Air-dried | Heat-cured |
| Rocker Hardness | 2 | 12 | 22 | 44 |
| Chemical Resistance | | | | |
| Ethanol | Good | Good | Poor | Good |
| Xylene | Good | excellent | excellent | excellent |
| Ethyl Acetate | Poor | Fair | Poor | Good |
| Trichloroethylene | Poor | Good | Poor | Fair |
| Methyl ethyl ketone | Poor | Good | Poor | Fair |
| Cellosolve acetate | Poor | Good | Poor | Good |
| Butyl acetate | Poor | Good | Poor | Good |

EXAMPLE III

A polyurethane prepolymer made from 46.0 percent polypropylene glycol of molecular weight 1,025, 15.7 percent polypropylene glycol of molecular weight 2,025, 3.2 percent bisphenol A and 35.0 percent 4,4'-methylene bis (cyclohexyl isocyanate) was prepared in a manner usual for the preparation of polyurethane prepolymers. 90.8 Parts of this prepolymer were reacted with 9.2 parts of 1-amino-3-aminomethyl-3,5,5-trimethyl cyclohexane in 500 parts of isopropyl alcohol to zero percent free NCO.

42.5 grams of this lacquer solution were mixed with 2.5 grams of a blocked polyurethane solution made from 0.99 grams trimethylol propane, 0.24 grams of (80/20-2, 4/2,6) toluene diisocyanate, 0.37 grams of methyl ethyl ketoxime and 0.9 grams of ethyl acetate. This blocked polymer solution was made by first producing a prepolymer in the usual way from the trimethylol propane and toluene diisocyanate and blocking by exothermically reacting the prepolymer with the ketoxime in the solvent and heating for an hour at 50° to 60° C. after the exothermic heat had been dissipated. 5.5 grams of dimethyl formamide were added to this blocked system to assist solution, making a total weight of 50.5 grams. To 42.0 grams of this system were added 2.6 grams of water (7.3 percent of the total amount of solvent).

This new formulation was cast on two separate glass plates, one labeled I and the other II. For each glass plate the film was cast twice to give as close to a 3 mil wet film as possible. Rocker hardness and solvent resistance were run on these films. Films I and II were dried in a 65° C. oven to drive off solvent. In each case the films were hazy. Film II was then heat cured for 5 minutes at 150° C., and then when it appeared this film was not completely unblocked, it was cured again this time at 200° C. for 5 minutes. The results are shown below:

EXAMPLE VI

Thin films of different mixtures of the compositions whose preparation is described in Examples IV and V above were heated on glass plates at 150° C. for 5 minutes. The films' properties are compared in Table II shown below. In the Table, IV and V designate products prepared as shown in Examples IV and V respectively.

TABLE II

| Mixture Composition | Parts IV | Parts V | Cure Schedule Temp. °C. | Min. |
|---|---|---|---|---|
| 1. | 1.0 | 49.0 | 65 | 15 |
| 2. | 1.0 | 49.0 | 65 | 15 |
|  |  |  | 150 | 10 |
| 3. | 2.5 | 47.5 | 65 | 15 |
| 4. | 2.5 | 47.5 | 65 | 15 |
|  |  |  | 150 | 10 |

| Mixture | Chemical resistance | | | | | |
|---|---|---|---|---|---|---|
|  | Trichloro-ethylene | Perchloro-ethylene | Cellosolve acetate | Methyl ethyl ketone | Isopropanol | Xylene |
| 1 | Fair | Good | Fair | Poor | Good | Good |
| 2 | Very good | Excellent | do | Fair | Very good | Excellent |
| 3 | Fair | Good | do | Poor | Good | Good |
| 4 | Very good | Excellent | do | Fair | Very good | Excellent |

| Rocker hardness | Solvent resistance | | | | |
|---|---|---|---|---|---|
|  | Isopropyl alcohol | Xylene | Ethyl acetate | Trichloro-ethylene | Methyl ethyl ketone |
| I | 10 (Dried at 65° C.) Fair | Good | Poor | Poor | Poor |
| II | 14 (Heat cured at 150° C.) do | Excellent | do | Good | Do. |
| II | 14 (Heat cured at 200° C.) do | do | Good | do | Fair |

EXAMPLE IV

Seven hundred parts of a 60 percent non-volatiles solution of a 1-isocyanato-3-isocyanato-methyl-3,5,5-trimethyl cyclohexane-trimethylol propane adduct in a 50:50 mixture of Cellosolve acetate and xylene and containing about 7.6 percent NCO by weight was heated with 90 parts acetone oxime in 258 parts additional cellosolve acetate as diluent. The amount of oxime employed corresponded to that which is essentially the equivalent to the residual NCO in the above mentioned adduct. The reaction mixture was heated at about 70° C. until all of the NCO groups had been blocked with oxime. The product obtained was a viscous solution (10.2 G - H seconds) and had a non-volatile content of 49.6 percent.

EXAMPLE V

A mixture of about 325 parts of the prepolymer prepared in Example IA above in about 140 parts of methyl ethyl ketone is reacted with a solution of about 25 parts 1-amino-3-aminomethyl-3,5,5-trimethyl cyclohexane in 385 parts methyl ethyl ketone, 46 parts water and 30 parts isopropyl alcohol. The reaction mixture had the following properties:

| | |
|---|---|
| Non-volatile content | 35.3 |
| Amine Value | 1.92 |
| Viscosity | 12.8 G - H seconds |
| Gardner Color | 1 |

It is claimed

1. A curable polyurethane composition comprising:
   I. A normally-liquid, free isocyanate-blocked urethane prepolymer composition comprising the reaction product of (A) an isocyanate group-terminated polyurethane of essentially hydrocarbon diisocyanate and aliphatic polyol, and (B) an isocyanate-reactive oxime, said reaction product containing essentially the stoichiometric equivalent of (B) per equivalent of free isocyanate in (A); and
   II. an elastomeric, polyamine-extended polyurethane comprising the reaction product of (A) an isocyanate group-terminated polyurethane of essentially hydrocarbon diisocyanate and aliphatic polyol, and (B) an isocyanate-reactive polyamine, said reaction product containing essentially the stoichiometric equivalent of (B) per equivalent of free isocyanate in (A), and the amounts of (II) being such as to provide about 0.01 to 150 nitrogen atoms having at least one hydrogen atom per equivalent of blocked isocyanate group in (I).

2. The composition of claim 1 in which there are about 0.1 to 50 nitrogen atoms having at least one hydrogen atom per equivalent of blocked isocyanate group in (I).

3. The composition of claim 1 wherein the aliphatic polyol in the reaction product of (I) has a molecular weight of up to about 200 and is composed to a major molar extent of polyol of at least three hydroxy groups per molecule.

4. The composition of claim 3 wherein the polyol in the reaction product of (I) is trimethylol propane.

5. The composition of claim 1 wherein the aliphatic polyol in the polyamine-extended polyurethane of (II) is polyester or polyether glycol of about 750 to 4,000 molecular weight.

6. The composition of claim 1 wherein the isocyanate reactive oxime of (I) has the formula

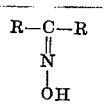

wherein R is an essentially hydrocarbyl group of up to about 20 carbon atoms or hydrogen.

7. The composition of claim 6 wherein the R groups are lower alkyl or hydrogen.

8. The composition of claim 7 wherein each R group is lower alkyl.

9. The composition of claim 3 wherein the isocyanate reactive oxime of (I) has the formula

wherein R is an essentially hydrocarbyl group of up to about 20 carbon atoms or is hydrogen.

10. The composition of claim 9 wherein the R groups are lower alkyl or hydrogen.

11. The composition of claim 10 wherein each R group is lower alkyl.

12. The composition of claim 1 wherein the isocyanate-reactive polyamine in (II) is diamine.

13. The composition of claim 12 wherein the isocyanate-reactant polyamine in (II) is aliphatic diprimary diamine.

14. The composition of claim 13 wherein the diamine is 1-amino-3-aminomethyl-3,5,5-trimethylcyclohexane.

15. The composition of claim 1 wherein at least one of the diisocyanates of (I) and (II) is aromatic.

16. The composition of claim 1 wherein both the diisocyanates of (I) and (II) are aromatic.

17. A cured composition of claim 1, said composition having been cured at above about 100° C.

18. A cured composition of claim 2, said composition having been cured at above about 100° C.

19. A cured composition of claim 3, said composition having been cured at above about 100° C.

20. A cured composition of claim 4, said composition having been cured at above about 100° C.

21. A cured composition of claim 5, said composition having been cured at above about 100° C.

22. A cured composition of claim 6, said composition having been cured at above about 100° C.

23. A cured composition of claim 7, said composition having been cured at above about 100° C.

24. A cured composition of claim 8, said composition having been cured at above about 100° C.

25. A cured composition of claim 9, said composition having been cured at above about 100° C.

26. A cured composition of claim 10, said composition having been cured at above about 100° C.

27. A cured composition of claim 11, said composition having been cured at above about 100° C.

28. A cured composition of claim 12, said composition having been cured at above about 100° C.

29. A cured composition of claim 13, said composition having been cured at above about 100° C.

30. A cured composition of claim 14, said composition having been cured at above about 100° C.

31. A cured composition of claim 15, said composition having been cured at above about 100° C.

32. A cured composition of claim 16, said composition having been cured at above about 100° C.

* * * * *